(12) United States Patent
Kim et al.

(10) Patent No.: US 11,384,874 B2
(45) Date of Patent: Jul. 12, 2022

(54) FITTING DEVICE FOR MAKING CONNECTION TUBE THAT CAN FINE POSITION ADJUSTMENT OF THE TUBE

(71) Applicant: Brian B. Kim, Flower Mound, TX (US)

(72) Inventors: Jae Gon Kim, Yangsan-Si (KR); Byong Hwan Shin, Busan (KR)

(73) Assignee: Joe Gon Kim, Flower Mound, TX (US)

( * ) Notice: Subject to any disclaimer, the term of this patent is extended or adjusted under 35 U.S.C. 154(b) by 171 days.

(21) Appl. No.: 16/175,155

(22) Filed: Feb. 11, 2019

(65) Prior Publication Data

US 2019/0309881 A1 Oct. 10, 2019

(51) Int. Cl.
*F16L 19/02* (2006.01)
*F16L 19/00* (2006.01)

(52) U.S. Cl.
CPC ......... *F16L 19/0218* (2013.01); *F16L 19/005* (2013.01)

(58) Field of Classification Search
CPC ....... F16L 19/10; F16L 19/06; F16L 19/0653; F16L 19/065; F16L 19/005; F16L 19/006; F16L 19/021; F16L 19/0218
USPC .......................................................... 285/341
See application file for complete search history.

(56) References Cited

U.S. PATENT DOCUMENTS

| | | | | |
|---|---|---|---|---|
| 2,437,632 A | * | 3/1948 | Wolfram | ............... F16L 19/08 |
| 2,535,694 A | | 12/1950 | Payne | |
| 2,570,224 A | * | 10/1951 | Fason | ............... F16L 19/08 |
| 2,772,100 A | * | 11/1956 | Kreissig | ............... F16L 19/075 |
| | | | | 285/342 |
| 2,914,347 A | | 10/1959 | Magnani | |
| 3,432,187 A | | 3/1969 | Mooney et al. | |
| 5,894,864 A | | 4/1999 | Rich | |
| 5,908,211 A | * | 6/1999 | Blackwell | |
| 9,470,347 B1 | * | 10/2016 | Peirce | ............... F16L 19/10 |
| 2006/0138771 A1 | * | 6/2006 | Galante | ............... F16L 19/065 |
| 2010/0140932 A1 | | 6/2010 | Williams et al. | |
| 2013/0168959 A1 | * | 7/2013 | Turk | ............... F16L 19/065 |

FOREIGN PATENT DOCUMENTS

| | | |
|---|---|---|
| GB | 525153 | 8/1940 |
| JP | 5298219 | 8/1977 |
| JP | H-07317971 | 12/1995 |
| JP | 2002-200980000 | 1/2001 |
| KR | 10-2015-7011042 | 9/2013 |
| KR | 10-1518377 | 4/2015 |

* cited by examiner

*Primary Examiner* — Zachary T Dragicevich
(74) *Attorney, Agent, or Firm* — Sul Lee Law Firm PLLC (57) ABSTRACT

A tube fitting device for facilitating tube connection position determination includes a fitting body, a pair of fixing nuts, and an O-ring. The fitting body has a cylindrical channel portion into which a first tube and a second tube may be inserted, the cylindrical channel portion comprising an accommodation groove formed therein. Each fixing nut is rotatably coupled to a respective open end of the fitting body and surrounds the first tube and the second tube, respectively. The O-ring is mounted on the accommodation groove and has an inner diameter smaller than that of the cylindrical channel portion such that the inner surface of the O-ring protrudes inside the fitting body to facilitate determining positions of the first tube and the second tube to be inserted into the cylindrical channel of the fitting body.

5 Claims, 9 Drawing Sheets

FITTING DEVICE FOR MAKING CONNECTION TUBE THAT CAN FINE POSITION ADJUSTMENT OF THE TUBE

CROSS-REFERENCE TO RELATED APPLICATION

This application claims the benefit of priority to Korean Patent Application No. 10-2018-0040596 filed on Apr. 6, 2018, which is incorporated by reference in its entirety.

FIELD OF THE INVENTION

The present invention relates to a tube fitting device for facilitating tube connection position determination and more particularly, to a tube fitting technique for determining airtightness and positions of tubes when the tubes are connected.

BACKGROUND

Commonly, in order to connect tubes, the tubes are expanded for another tube to be inserted and are connected through welding. However, the connection of the tubes through welding requires a specialized skill of an expert and a working tool for welding. In addition, welding can cause fire hazards and require a long working time.

In order to overcome such disadvantages, a fitting device has been developed to allow tubes to be coupled by a nut. The fitting device does not require a specialized skill and various working tools. In addition, the fitting device does not need any welding, so does not cause fire hazards. Above all, the fitting device requires a short working time.

In a fitting device for connecting tubes, the tubes are rapidly connected, but airtightness by the connection of the tubes should be maintained.

In addition, in a case in which the tubes have different lengths and are fixed when the tubes are connected, it is necessary to move the fitting device. In this case, it is difficult to accurately grasp a position where the tubes are connected.

SUMMARY

The present invention has been made to solve the above problems and provides a tube fitting device for facilitating tube connection position determination, capable of determining positions of tubes accommodated in both sides thereof when the tubes are connected.

In addition, the present invention provides a tube fitting device for facilitating tube connection position determination, capable of maintaining internal airtightness when tubes are connected.

Further, the present invention provides a tube fitting device for facilitating tube connection position determination, which allows tubes to be temporarily fixed when the tubes are connected.

In order to solve the above problems, the present invention provides a tube fitting device for facilitating tube connection position determination, the tube fitting device including: a fitting body comprising a cylindrical channel portion into which a first tube and a second tube may be inserted, the cylindrical channel portion comprising an accommodation groove formed therein; a pair of fixing nuts, each fixing nut rotatably coupled to a respective open end of the fitting body and surrounding a respective one of the first tube and the second tube; and an O-ring mounted in the accommodation groove and having an inner diameter smaller than that of the cylindrical channel portion such that the inner surface of the O-ring protrudes inside the fitting body to facilitate determining positions of the first tube and the second tube to be inserted into the cylindrical channel of the fitting body.

According to an embodiment, the fitting body may have a tapered inclined surface formed inside proximate to each open end of the fitting body 100 such that when the first tube 10 and the second tube 20 are inserted into the fitting body 100, a gap is formed between the fitting body 100 and the first tube 10 and between the fitting body 100 and the second tube 20.

According to an embodiment, the tube fitting device may further include a collet inside each fixing nut, the each collet comprising: a mounting portion provided inside the fixing nut; a bending portion connected to the mounting portion, the bending portion comprising a bending groove formed therein, and an end portion located at an inclined gap of the fitting body such that the bending portion enters the gap to be downwardly bent when the fixing nut is tightened; a pressing portion formed at an inner surface of the collet proximate to the end portion of the bending portion to pressurize and seal a respective one of the first tube and the second tube; and a protecting portion protruding from the end portion of the bending portion to protect the pressing portion.

According to an embodiment, the tube fitting device may further include a fixing nut packing located inside each of the pair of fixing nuts and closely fixed to the respective one of the first tube and the second tube to prevent movement of the respective fixing nut, each fixing nut packing being in close contact with the mounting portion of the collet to prevent the collet from being pushed.

According to an embodiment, the tube fitting device may further include a fitting body packing installed inside each open end of the fitting body to be in close contact with each of the respective first tube and second tube, and comes into close contact with the respective protecting portion when the collet enters the gap.

According to an embodiment, an adhesive tape may be taped on outer surfaces of the fitting body and the fixing nuts to prevent rotation of the fixing nuts and maintain a certain distance between the fitting body and the fixing nuts.

Due to the configuration provided in Technical Solution, the following effects can be expected.

First, according to the present disclosure, tubes inserted into both sides can be hung on an O-ring, thereby determining positions of the tubes to be connected.

The tubes to be connected can be pressurized and sealed by deformation of a collet bent by rotation of a fixing nut. A pressing portion configured to directly perform sealing in the collet can be protected by a protecting portion, thereby preventing the pressing portion from being stabbed or damaged by impact between the pressing portion and other goods.

In addition, due to a fitting body packing inside a fitting body and a fixing nut packing inside the fixing nut, the tubes and a tube fitting device for facilitating tube connection position determination can be manually rotated and temporarily fixed and then can be tightened by using a spanner, so that a separate fixing device may not be required.

DETAILED DESCRIPTION

Hereinafter, embodiments of the present disclosure will be described with reference to the accompanying drawings.

Figure 1:
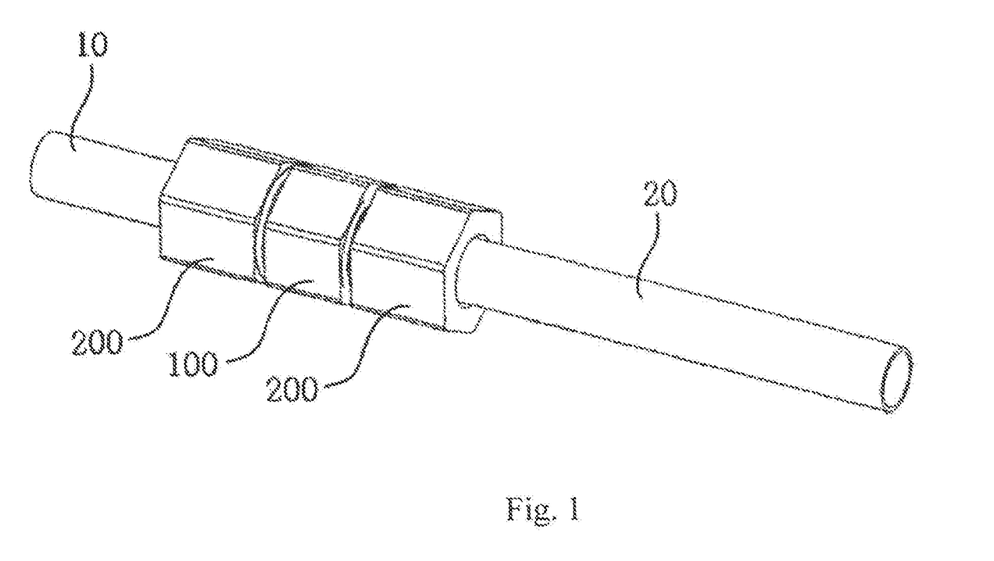
FIG. 1 is a perspective view illustrating a tube fitting device for facilitating tube connection position determination according to an embodiment of the present disclosure.

FIG. 1 is a perspective view illustrating a tube fitting device for facilitating tube connection position determination according to an embodiment of the present disclosure.

Referring to FIG. 1, the tube fitting device according to the present disclosure has a structure in which a fitting body 100 is located at a portion where a first tube 10 and a second tube 20 are coupled, and the first tube 10 and the second tube 20 are connected by tightening fixing nuts 200 at both sides thereof.

Figure 2:
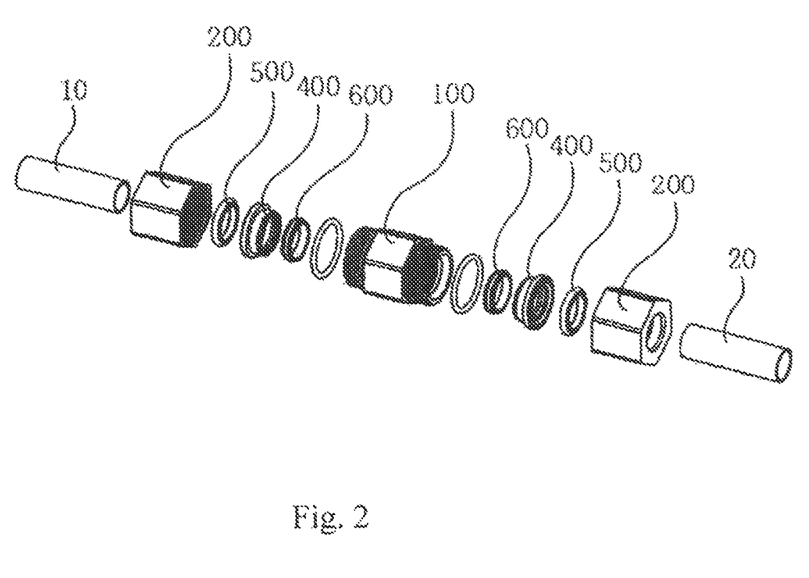
FIG. 2 is an exploded perspective view illustrating the tube fitting device for facilitating the tube connection position determination according to an embodiment of the present disclosure.
Figure 3:
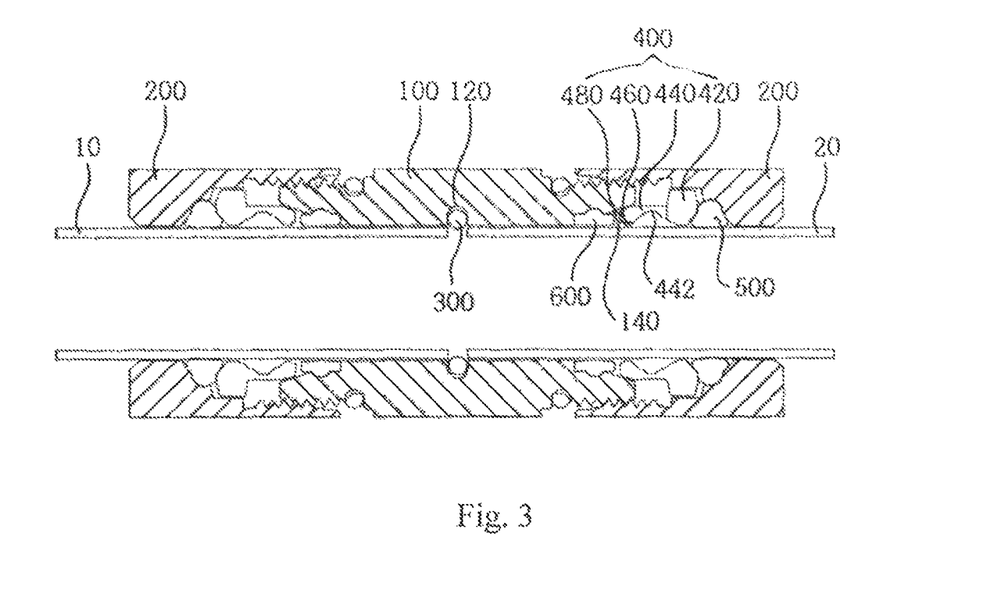
FIG. 3 is an internal cross-sectional view of FIG. 1 according to an embodiment of the present disclosure.

FIG. 2 is an exploded perspective view illustrating the tube fitting device for facilitating the tube connection position determination according to the embodiment of the present disclosure. FIG. 3 is an internal cross-sectional view of FIG. 1.

Referring to FIGS. 2 and 3, the tube fitting device for facilitating the tube connection position determination according to the present disclosure mainly includes the fitting body 100, a pair of fixing nuts 200, and an O-ring 300.

The fitting body 100 is a main body configured to connect a first tube 10 and a second tube 20, which are both inserted into the fitting body 100.

The fitting body 100 is formed to have an overall cylindrical shape, and an outer circumferential surface thereof is formed to have a nut shape so as to be fastened to a spanner tool.

According to an embodiment, male threaded portions are formed at both open ends of the fitting body 100 and are rotatably connected to female threaded portions of the fixing nuts 200.

The fitting body 100 has an accommodation groove 120 formed therein. According to an embodiment, the accommodation groove 120 is formed at an inner middle portion of the fitting body 100 and is formed to have a ring shape along an inner circumferential surface in a cylindrical channel portion of the fitting body 100. An O-ring 300 is inserted into the accommodation groove 120.

According to an embodiment, the accommodation groove 120 is preferably formed to have a depth enough to accommodate the O-ring 300. An inlet side of the accommodation groove 120 is formed to have a width smaller than a thickness of the O-ring 300 such that the O-ring 300 is mounted and is prevented from deviating from the accommodation groove 120.

The pair of the fixing nuts 200 are provided, are rotatably connected to both open ends of the fitting body 100, and are tightened to fix the first tube 10 and the second tube 20 in their respective positions.

The combination of the accommodation groove 120 and the O-ring 300 allows insertion positions of the first tube 10 and the second tube 20 to be specified. That is, the O-ring 300 may be used to determine a depth of insertion for the first tube 10 and the second tube 20.

The O-ring 300 is mounted on the accommodation groove 120. A portion of the O-ring 300 protrudes inside the fitting body 100, and thus, when the first tube 10 and the second tube 20 are inserted into the fitting body 100, the O-ring 300 may allow the insertion positions of the first tube 10 and the second tube 20 to be specified due to the first tube 10 and the second tube 20 abutting against the O-ring 30.

According to an embodiment, the O-ring 300 is made of an elastic material such as rubber and has a certain degree of elastic force, such that an internal diameter thereof may be extended.

According to an embodiment, the internal diameter of the O-ring 300 is extended such that when the first tube 10 or the second tube 20 presses against the O-ring 300 at a pressure exceeding a certain value, the O-ring 300 is stretched to fill the outer diameter of the accommodation groove 120 such that the first tube 10 or the second tube 20 may pass through the O-ring 300.

As described above, when the first tube 10 or the second tube 20 presses against the O-ring 300 at the pressure exceeding the certain value, the first tube 10 and the second tube 20 is designed to pass through the O-ring 300, such that the fitting body 100 may be freely moved toward the first tube 10 or the second tube 20.

The fitting body 100 may be freely moved on the first tube 10 or the second tube 20, so as to prepare for a case in which the first tube 10 or the second tube 20 itself is not freely moved due to the first tube 10 or the second tube 20 being fixed to a certain portion.

The fitting body 100 is characterized in that a tapered inclined surface 140 is formed inside each of both end portions thereof and thus a circumferential gap is formed between a first end portion of the fitting body 100 and the first tube 10 and between a second end portion of the fitting body 100 and the second tube 20.

According to an embodiment, a collet 400 is provided inside each of the fixing nuts 200 such as to squeeze against the respective first tube 10 and the second tube 20 when the fixing nuts 200 are rotationally tightened against the fitting body 100.

According to an embodiment, the collet 400 includes a mounting portion 420, a bending portion 440, a pressing portion 460, and a protecting portion 480, and is integrally formed. The following description of the collet 400 is described with regard to a collet interfacing with the second end portion of the fitting body 100 and the second tube 20; however, the same would apply to a collet interfacing with the first end portion of the fitting body and the first tube 10.

According to an embodiment, the collet 400 includes the seating portion 420 provided inside the fixing nut 200 and formed in a ring shape, the bending portion 440 which extends from the seating portion 420 and in which a bending groove 442 is formed at the inner side of the bending portion. An end portion of the bending portion 440 is positioned at the opening of the gap between the fitting body and the second pipe 20 and is pushed into the gap when the fixing nut 200 is tightened, causing the bending portion 440 to be bent downward at the bending groove 442. The pressing portion 460 is formed at an inner surface proximate to the end portion of the bending portion 440 and pinches against and seals the second pipe 20. The protecting portion 480 protrudes longitudinally from the end portion of the bending portion 440 and protects the pressing portion 460.

According to an embodiment, the collet 400 is moved toward the fitting body 100 and is pressurized when the fixing nut 200 is tightened. In this case, when the end portion of the bending portion 440 enters the gap along the tapered inclined surface 140 of the fitting body 100 and is pressurized, the bending portion 440 is deformed at the bending groove 442, and an internal diameter thereof is decreased. Thus, the pressing portion 460 at a lower side of the end portion presses against and pinches the outer circumferential surface of each of the first tube 10 and the second tube 20 and seals each of the first tube 10 and the second tube 20.

According to an embodiment, a fixing nut packing 500 may be provided inside each of the pair of fixing nuts 200 closely fixed to the respective first tube 10 or second tube 20 to prevent movement of the fixing nut 200, and in close contact with the mounting portion 420 of the collet 400 to prevent the collet 400 from being pushed.

According to an embodiment, a pair of fitting body packings 600 may be provided inside the fitting body 100, each fitting body packing installed in close contact with the respective first tube 10 and second tube 20 and to come into close contact with (or abuts against) the protecting portion 480 when the collet 400 enters the gap.

According to an embodiment, the fixing nut packing 500 and the fitting body packing 600 are made of an elastic material such as rubber, which is pressurized and pressed onto a tube.

Meanwhile, since the protecting portion 480 is formed, the pressing portion 460 may be prevented from coming into contact with other goods, thereby protecting the pressing portion 460. In addition, since the protecting portion 480 is formed in front of the pressing portion 460, a direct contact between the pressing portion 460 and the fitting body packing 600 may be prevented to prevent the fitting body packing 600 from being punctured by the pressing portion 460, thereby also protecting the fitting body packing 600.

Next, a method of using a tube fitting device for facilitating tube connection position determination according to an embodiment of the present disclosure will be described.

First, when a first tube and a second tube are free, a method of using a tube fitting device for facilitating tube connection position determination will be described.

Figure 4A:
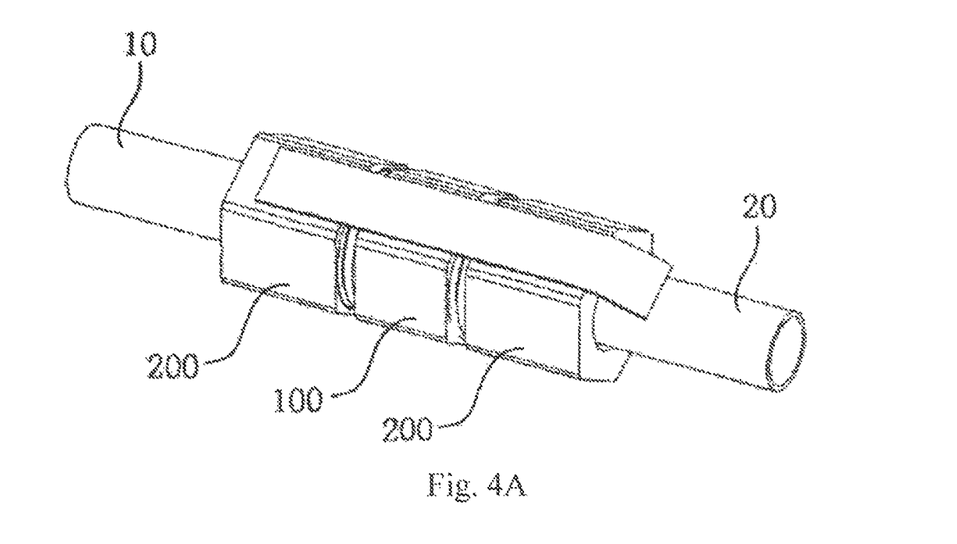
FIG. 4A is a view illustrating an assembled state of a tube fitting device in which tubes are unfixed and free to move according to an embodiment of the present disclosure and FIG. 4B is an internal cross sectional view of FIG. 4A according to an embodiment of the present disclosure
Figure 4B:
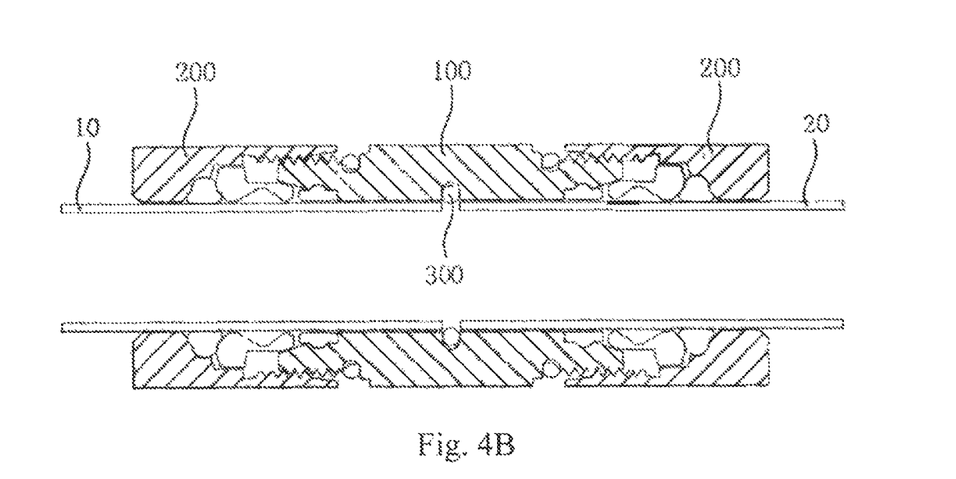

FIG. 4A is a view exemplarily illustrating an assembled state of a tube fitting device in which tubes are unfixed and free to move and FIG. 4B is an internal cross sectional view of FIG. 4A according to an embodiment of the present disclosure.

Referring to FIG. 4A and FIG. 4B, a first tube 10 and a second tube 20 may be inserted into a first open and a second open end of a fitting body 100, respectively, and may each of the first tube 10 and the second tube 20 may abut an O-ring 300. Thus, positions of the first tube 10 and the second tube 20 may be adjusted, and the first tube 10 and the second tube 20 may be tightened and connected to the fitting body 100.

Next, method first stage of using a tube fitting device for facilitating tube connection position determination will be described.

Figure 5A:
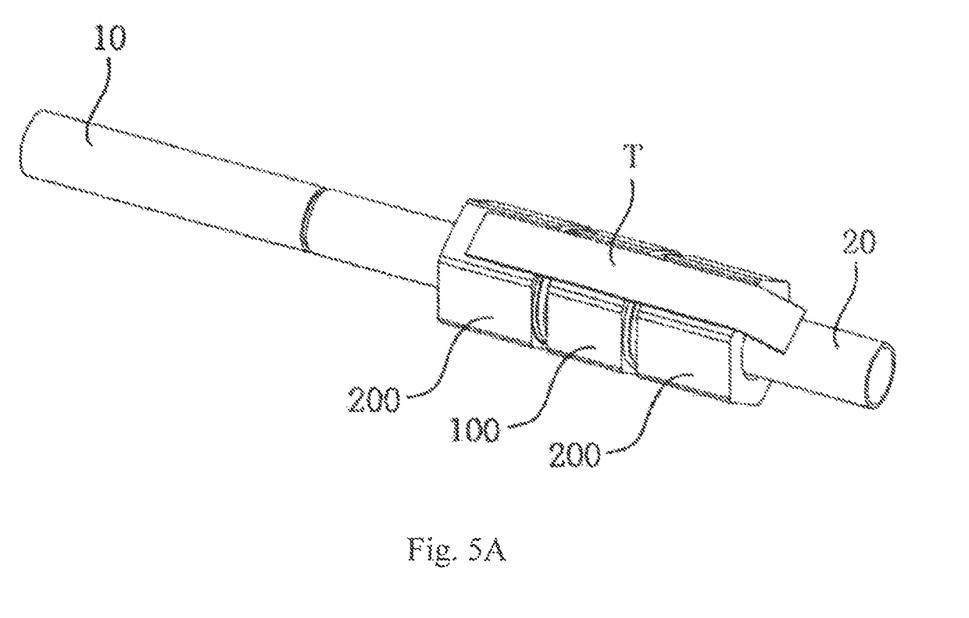
FIG. 5A is a view illustrating a first stage of an assembled state of a tube fitting device in which tubes are not free according to an embodiment of the present disclosure and FIG. 5B is an internal cross section view of FIG. 5A according to an embodiment of the present disclosure.
Figure 5B:
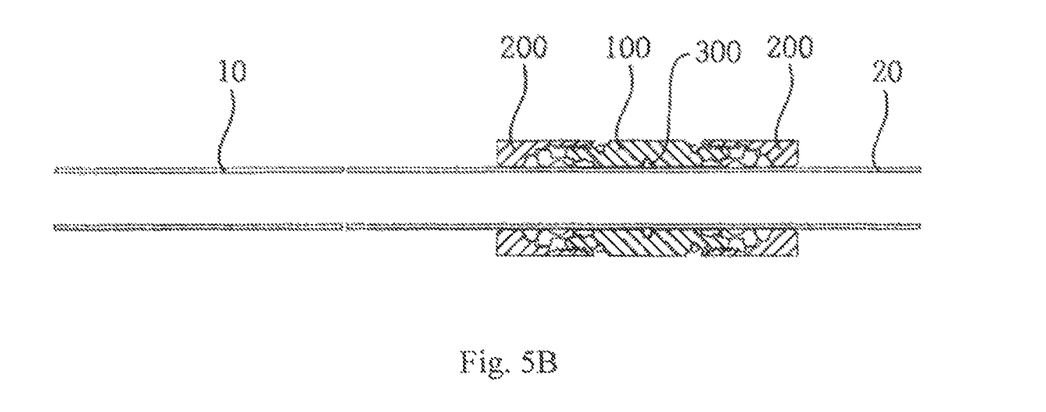

FIG. 5A is a view exemplarily illustrating a first stage of an assembled state of a tube fitting device according to an embodiment of the present disclosure and FIG. 5B is an internal cross sectional view of FIG. 5A according to an embodiment of the present disclosure.

According to an embodiment a fitting body 100 and fixing nuts 200 are coupled. According an embodiment, outer surfaces of the fitting body 100 and the fixing nuts 200 are fixed by a tape T, such that the fitting body 100 and the fixing nuts 200 are in a state of being neither tightened nor released. This is because if the fitting body 100 and the fixing nuts 200 were to be excessively tightened, an internal diameter of nut packing 500 and the body packing 600 inside the fixing nut 200 would be decreased due to pressure, and thus a first tube 10 or a second tube 20 may not be able to be inserted. According to an embodiment, since the fixing nut 200 coupled to the fitting body 100 is movable on an outer circumferential surface of the second tube 20, there is an advantage in that the tube fitting device can be customized to desired depths for each of the first tube 10 and the second tube 20.

Figure 6A:
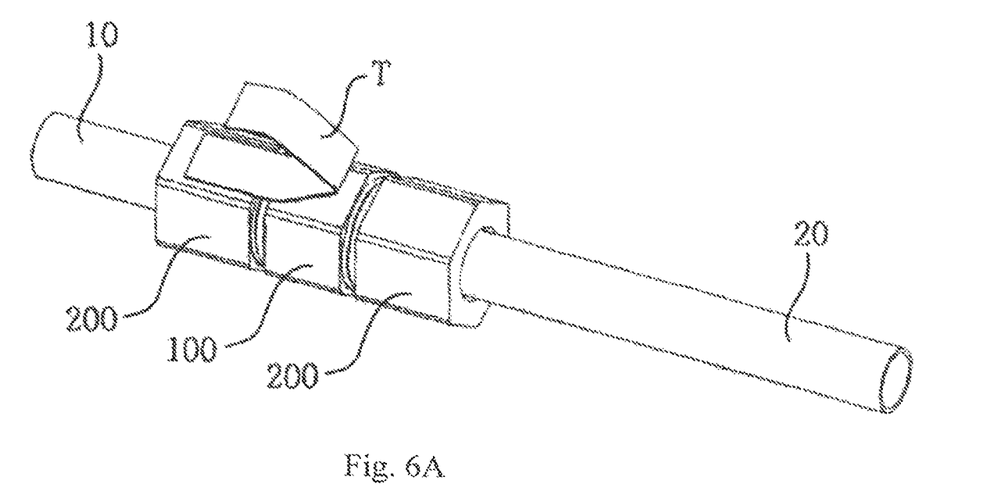
FIG. 6A is a view illustrating a second stage of the assembled state of the tube fitting device in which the tubes are not free according to an embodiment of the present disclosure and 6B is an internal cross section view of FIG. 6A according to an embodiment of the present disclosure.
Figure 6B:
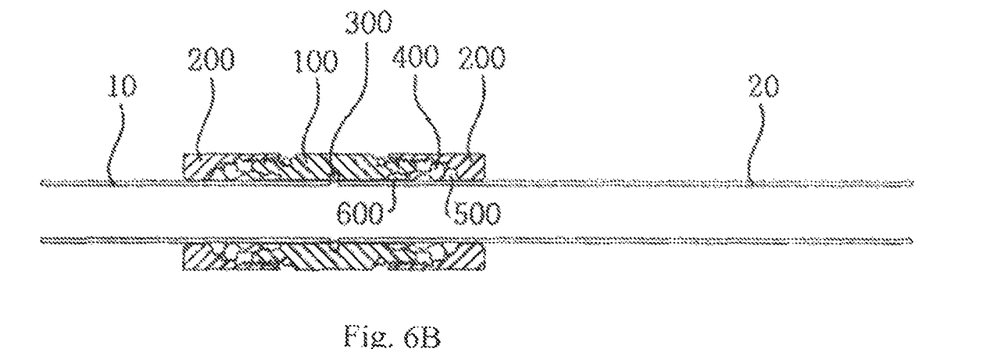

FIG. 6A is a view exemplarily illustrating a second stage of the assembled state of the tube fitting device according to an embodiment of the present disclosure and FIG. 6B is an internal cross sectional view of FIG. 6A according to an embodiment of the present disclosure.

According to an embodiment, the fitting body 100, to which the fixing nuts 200 are coupled, is moved toward the first tube 10, an O-ring 300 is located between the first tube 10 and the second tube 20, and then, the tape T is removed. According to an embodiment, because the inner diameter of the O-ring 300 is smaller than the outer diameters of the first tube 10 and the second tube 20, one will be able to detect when the first tube 10 and the second tube 20 are each abutting the O-ring 300.

Figure 7A:
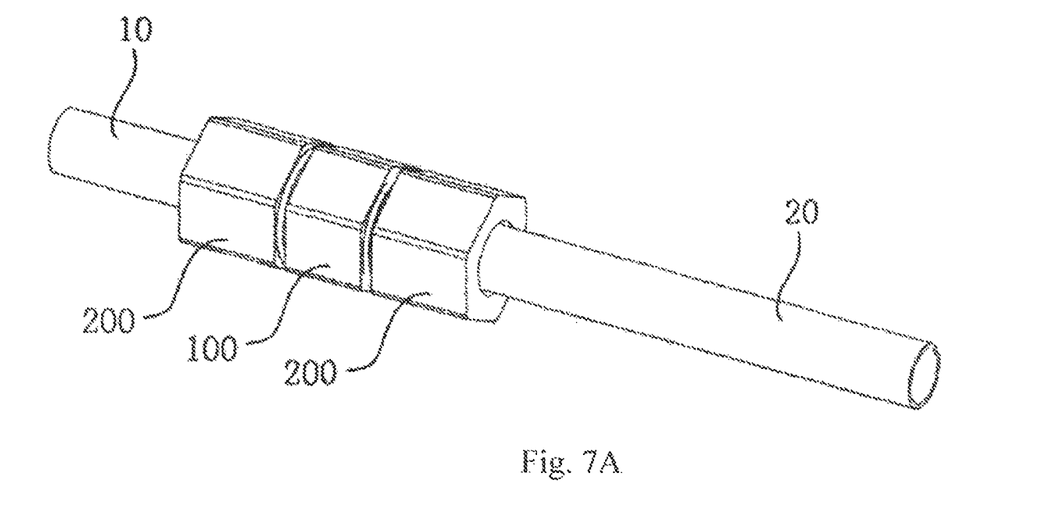
FIG. 7A is a view illustrating a third stage of the assembled state of the tube fitting device in which the tubes are not free according to an embodiment of the present disclosure and FIG. 7B is an internal cross sectional view of FIG. 7A according to an embodiment of the present disclosure.
Figure 7B:
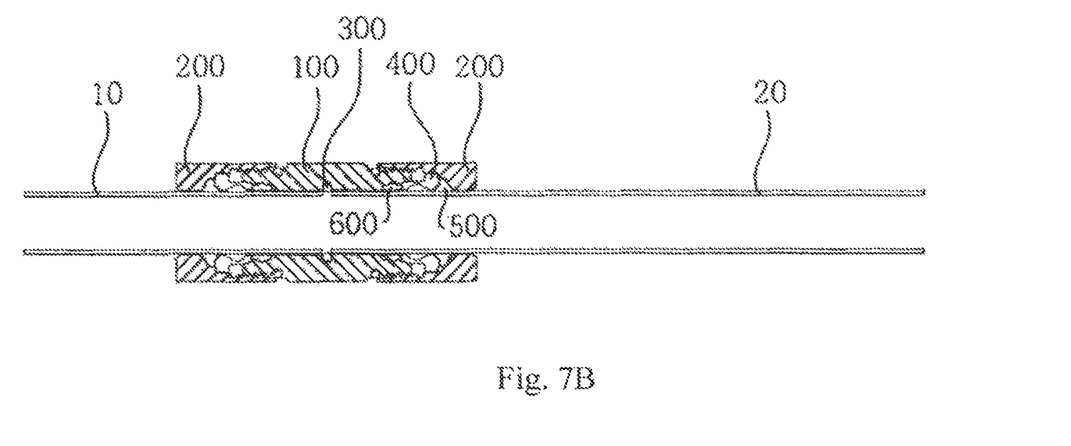

FIG. 7A is a view exemplarily illustrating a third stage of the assembled state of the tube fitting device in which the tubes cannot be freely moved according to an embodiment of the present disclosure and FIG. 7B is an internal cross sectional view of FIG. 7A according to an embodiment of the present disclosure.

According to an embodiment, when the fixing nuts 200 coupled to the fitting body 100 are manually rotated and tightened, a fixing nut packing 500 is pressed, and thus, each of the first tube 10 and the second tube 20 is temporarily fixed.

Figure 8A:
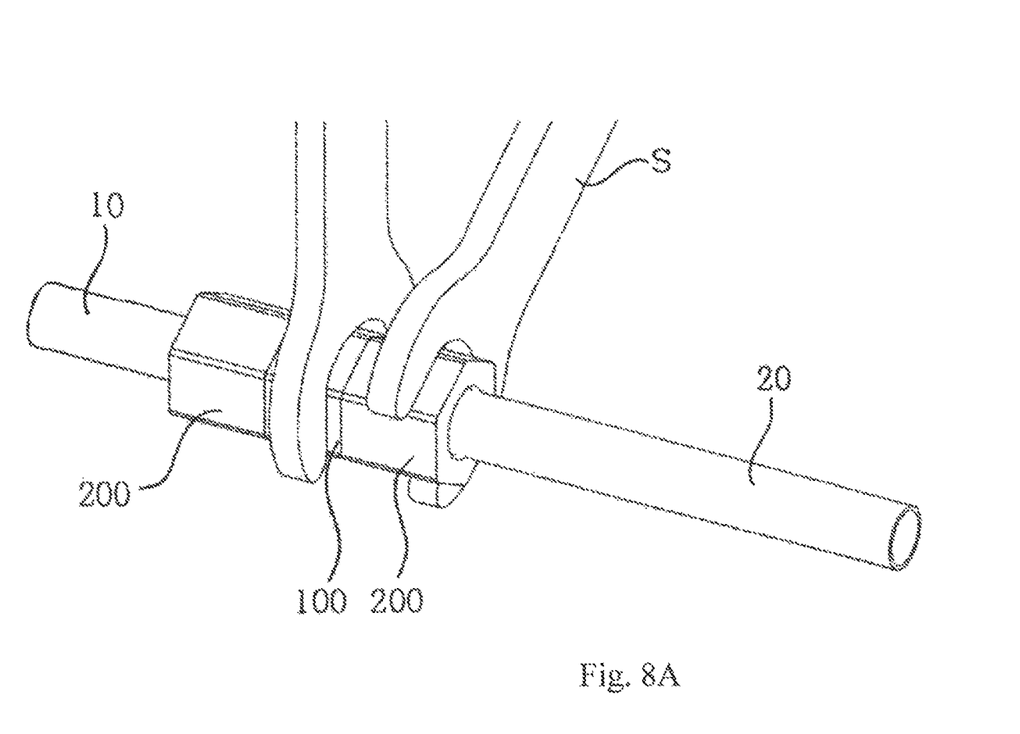
FIG. 8A is a view illustrating a fourth stage of the assembled state of the tube fitting device in which the tubes are not free according to an embodiment of the present disclosure and FIG. 8B is an internal cross sectional view of FIG. 8A according to an embodiment of present disclosure.
Figure 8B:
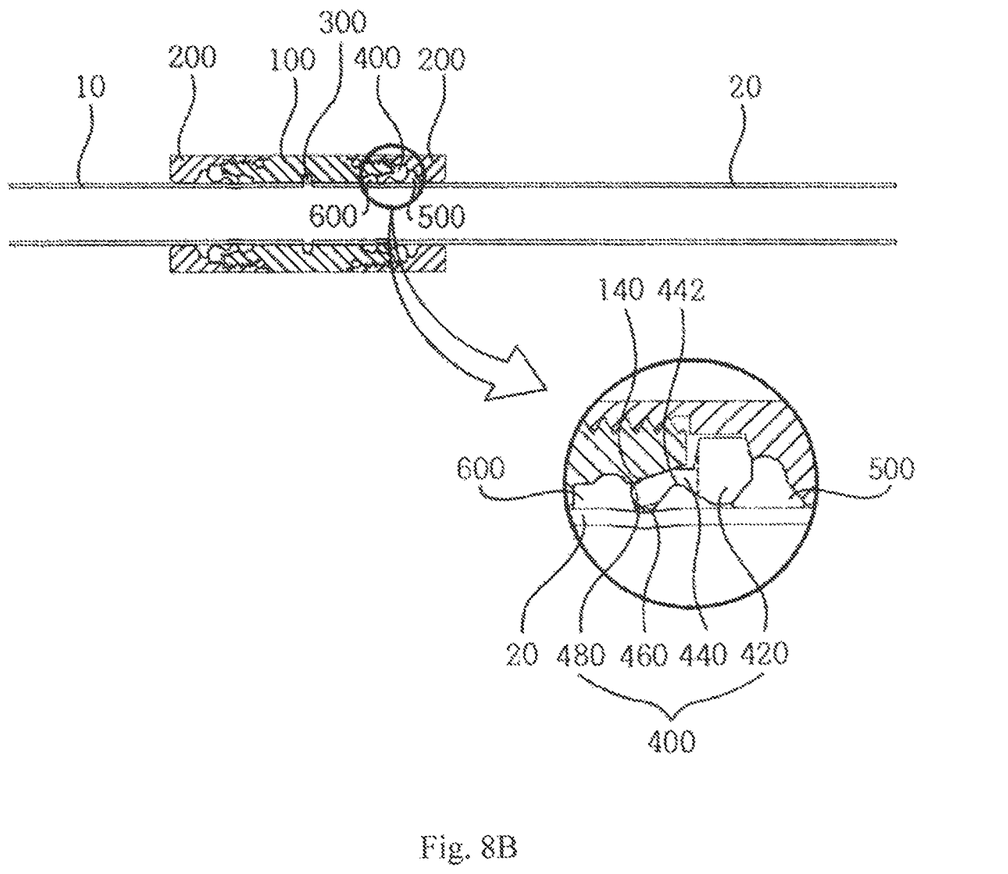

FIG. 8A is a view exemplarily illustrating a fourth stage of the assembled state of the tube fitting device in which the tubes are fixed, according to an embodiment of the present disclosure and FIG. 8B is an internal cross sectional view of FIG. 8A according to an embodiment of the present disclosure.

According to an embodiment, when the fixing nuts 200 are further rotated and tightened toward the fitting body 100 by a spanner S, the collet 400 is pressed, and a bending portion 440 is deformed. A pressing portion 460 pinches and seals the second tube 20, and concurrently, a protecting portion 480 also presses against a fitting body packing 600, and sealing is performed between the fitting body packing 600 and the second tube 20. The first tube 10 is also fixed in the same manner.

The scope of the present disclosure is not limited to the above-described specific embodiments. Various other embodiments that may be changed or modified by those skilled in the art without departing from the scope and spirit of the present disclosure defined by the appended claims fall within the scope of the present disclosure.

The invention claimed is:

1. A tube fitting device for facilitating tube connection position determination, the tube fitting device comprising:
   a fitting body comprising a cylindrical channel portion into which a first tube and a second tube may be inserted, the cylindrical channel portion comprising a single accommodation groove formed therein;
   a pair of fixing nuts, each fixing nut rotatably coupled to a respective open end of the fitting body and surrounding a respective one of the first tube and the second tube;
   a single elastic ring mounted in the accommodation groove and having an inner diameter smaller than the narrowest inner diameter of the fitting body such that the inner surface of the elastic ring protrudes inside the fitting body, the elastic ring configured to abut an end of the first tube and an end of the second tube to be inserted into the cylindrical channel of the fitting body; and
   a collet inside each fixing nut, the each collet comprising:
      a mounting portion provided inside the fixing nut,
      a bending portion connected to the mounting portion, the bending portion comprising a bending groove formed therein, and an end portion located at an inclined gap of the fitting body such that the bending portion enters the gap to be downwardly bent when the fixing nut is tightened,
      a pressing portion formed at an inner surface of the collet proximate to the end portion of the bending portion to pressurize and seal a respective one of the first tube and the second tube, and
      a protecting portion protruding from the end portion of the bending portion to protect the pressing portion.

2. The tube fitting device of claim 1, wherein the fitting body further comprises a tapered inclined surface formed inside proximate to each open end of the fitting body such that when the first tube and the second tube are inserted into the fitting body, a gap is formed between the fitting body and the first tube and between the fitting body and the second tube.

3. The tube fitting device of claim 1, further comprising a fixing nut packing located inside each of the pair of fixing nuts and closely fixed to the respective one of the first tube and the second tube to prevent movement of the respective fixing nut, each fixing nut packing being in close contact with the mounting portion of the collet to prevent the collet from being pushed.

4. The tube fitting device of claim 1, further comprising a fitting body packing installed inside each open end of the fitting body to be in close contact with each of the respective first tube and second tube and comes into close contact with the respective protecting portion when the collet enters the gap.

5. The tube fitting device of claim 1, where an adhesive tape is taped on outer surfaces of the fitting body and the fixing nuts to prevent rotation of the fixing nuts and to maintain a certain distance between the fitting body and the fixing nuts.

* * * * *

UNITED STATES PATENT AND TRADEMARK OFFICE
CERTIFICATE OF CORRECTION

| | | |
|---|---|---|
| PATENT NO. | : 11,384,874 B2 | Page 1 of 1 |
| APPLICATION NO. | : 16/175155 | |
| DATED | : July 12, 2022 | |
| INVENTOR(S) | : Jae Gon Kim and Byong Hwan Shin | |

It is certified that error appears in the above-identified patent and that said Letters Patent is hereby corrected as shown below:

On the Title Page

Item (30), please add the Korean Patent Application No. 10-2018-0040596, which was filed on Apr. 6, 2018.

Signed and Sealed this
Twelfth Day of August, 2025

Coke Morgan Stewart
*Acting Director of the United States Patent and Trademark Office*